US012781032B2

(12) United States Patent
Rodriguez Cortes

(10) Patent No.: US 12,781,032 B2
(45) **Date of Patent: *Nov. 3, 2026**

(54) POLYETHYLENE AND CONTROLLED RHEOLOGY POLYPROPYLENE POLYMER BLENDS AND METHODS OF USE

(71) Applicant: FINA TECHNOLOGY, INC., Houston, TX (US)

(72) Inventor: Leonardo Rodriguez Cortes, League City, TX (US)

(73) Assignee: FINA TECHNOLOGY, INC., Houston, TX (US)

( * ) Notice: Subject to any disclaimer, the term of this patent is extended or adjusted under 35 U.S.C. 154(b) by 447 days.

This patent is subject to a terminal disclaimer.

(21) Appl. No.: 18/626,605

(22) Filed: Apr. 4, 2024

(65) Prior Publication Data

US 2024/0247138 A1 Jul. 25, 2024

Related U.S. Application Data

(63) Continuation of application No. 16/569,062, filed on Sep. 12, 2019, now Pat. No. 11,993,699.

(60) Provisional application No. 62/731,198, filed on Sep. 14, 2018.

(51) Int. Cl.

| | |
|---|---|
| ***C08L 23/08*** | (2025.01) |
| ***B29C 48/00*** | (2019.01) |
| ***C08F 8/50*** | (2006.01) |
| ***C08J 5/18*** | (2006.01) |
| ***C08J 9/04*** | (2006.01) |
| ***C08L 23/0807*** | (2025.01) |
| ***C08L 23/12*** | (2006.01) |

(52) U.S. Cl.

CPC ........ *C08L 23/0815* (2013.01); *B29C 48/022* (2019.02); *C08F 8/50* (2013.01); *C08J 5/18* (2013.01); *C08J 9/04* (2013.01); *C08L 23/12* (2013.01); *B29K 2023/06* (2013.01); *C08F 2810/10* (2013.01); *C08J 2323/08* (2013.01); *C08J 2423/12* (2013.01); *C08L 2203/14* (2013.01); *C08L 2203/16* (2013.01); *C08L 2203/18* (2013.01); *C08L 2205/025* (2013.01); *C08L 2310/00* (2013.01)

(58) Field of Classification Search

CPC .................................................. C08L 23/0815

See application file for complete search history.

(56) References Cited

U.S. PATENT DOCUMENTS

| | | | |
|---|---|---|---|
| 3,687,920 | A | 8/1972 | Johnson |
| 4,086,408 | A | 4/1978 | Karol et al. |
| 4,101,445 | A | 7/1978 | Levine et al. |
| 4,298,718 | A | 11/1981 | Mayr et al. |
| 4,376,191 | A | 3/1983 | Geck |
| 4,482,687 | A | 11/1984 | Noshay et al. |
| 4,530,914 | A | 7/1985 | Ewen et al. |
| 4,542,199 | A | 9/1985 | Kaminsky et al. |
| 4,543,399 | A | 9/1985 | Jenkins et al. |
| 4,544,717 | A | 10/1985 | Mayr et al. |
| 4,560,671 | A | 12/1985 | Gross et al. |
| 4,588,790 | A | 5/1986 | Jenkins, III et al. |
| 4,665,208 | A | 5/1987 | Welborn, Jr. et al. |
| 4,701,432 | A | 10/1987 | Welborn, Jr. |
| 4,719,193 | A | 1/1988 | Levine et al. |
| 4,755,495 | A | 7/1988 | Cann et al. |
| 4,769,910 | A | 9/1988 | Noon |
| 4,794,096 | A | 12/1988 | Ewen |
| 4,808,561 | A | 2/1989 | Welborn, Jr. |
| 4,871,705 | A | 10/1989 | Hoel |
| 4,874,734 | A | 10/1989 | Kioka et al. |
| 4,908,463 | A | 3/1990 | Bottelberghe |
| 4,924,018 | A | 5/1990 | Bottelberghe |
| 4,931,417 | A | 6/1990 | Miya et al. |
| 4,933,403 | A | 6/1990 | Kaminsky et al. |
| 4,937,299 | A | 6/1990 | Ewen et al. |
| 4,952,540 | A | 8/1990 | Kioka et al. |
| 4,968,827 | A | 11/1990 | Davis |
| 4,975,403 | A | 12/1990 | Ewen |
| 4,987,200 | A | 1/1991 | Datta et al. |
| 5,017,714 | A | 5/1991 | Welborn, Jr. |
| 5,019,633 | A | 5/1991 | Wagner et al. |
| 5,026,798 | A | 6/1991 | Canich |
| 5,028,670 | A | 7/1991 | Chinh et al. |
| 5,057,475 | A | 10/1991 | Canich et al. |
| 5,070,055 | A | 12/1991 | Schramm et al. |
| 5,091,352 | A | 2/1992 | Kioka et al. |

(Continued)

FOREIGN PATENT DOCUMENTS

| | | | |
|---|---|---|---|
| EP | 0277003 | A1 | 8/1988 |
| EP | 0277004 | A1 | 8/1988 |
| EP | 0279586 | A2 | 8/1988 |
| EP | 0426637 | A2 | 5/1991 |

(Continued)

OTHER PUBLICATIONS

Matweb-Total PPH 3962 Polypropylene Homopolymer-Ultra-High Melt Flow Rate Pelletized for Melt Blown Fiber Applications; Retrieved from the internet on Nov. 11, 2019; URL:http://www.matweb.com/search/datasheettext/aspx?matguid=4c7082f8049a4a54ba695527f173a60a; 2 pages.

(Continued)

*Primary Examiner* — Irina Krylova

(74) *Attorney, Agent, or Firm* — Buchanan Ingersoll & Rooney PC

(57) ABSTRACT

Polymer blends, methods of making, and methods of using the polymer blends are described. A polymer blend can include a polyethylene (PE) polymer and a controlled rheology polypropylene (CRPP) polymer having a PE polymer to CRPP polymer (PE:CRPP) weight ratio of greater than 1:1.

18 Claims, No Drawings

(56) References Cited

U.S. PATENT DOCUMENTS 5,103,031 A 4/1992 Smith, Jr.
5,120,867 A 6/1992 Welborn, Jr.
5,132,381 A 7/1992 Winter et al.
5,145,819 A 9/1992 Winter et al.
5,155,180 A 10/1992 Takada et al.
5,198,401 A 3/1993 Turner et al.
5,204,419 A 4/1993 Tsutsui et al.
5,206,199 A 4/1993 Kioka et al.
5,239,022 A 8/1993 Winter et al.
5,243,001 A 9/1993 Winter et al.
5,248,801 A 9/1993 Sangokoya
5,276,208 A 1/1994 Winter et al.
5,278,119 A 1/1994 Turner et al.
5,296,434 A 3/1994 Karl et al.
5,304,614 A 4/1994 Winter et al.
5,308,815 A 5/1994 Sangokoya
5,317,036 A 5/1994 Brandy, III et al.
5,324,800 A 6/1994 Welborn, Jr. et al.
5,329,032 A 7/1994 Tran et al.
5,329,033 A 7/1994 Spaleck et al.
5,350,723 A 9/1994 Neithamer et al.
5,352,749 A 10/1994 DeChellis et al.
5,374,752 A 12/1994 Winter et al.
5,391,790 A 2/1995 Rohrmann et al.
5,405,922 A 4/1995 DeChellis et al.
5,436,304 A 7/1995 Griffin et al.
5,436,305 A 7/1995 Alt et al.
5,456,471 A 10/1995 MacDonald
5,462,999 A 10/1995 Griffin et al.
5,510,502 A 4/1996 Sugano et al.
5,525,678 A 6/1996 Mink et al.
5,532,396 A 7/1996 Winter et al.
5,543,373 A 8/1996 Winter et al.
5,554,704 A 9/1996 Burkhardt et al.
5,594,074 A 1/1997 Hwo et al.
5,616,661 A 4/1997 Eisinger et al.
5,627,242 A 5/1997 Jacobsen et al.
5,635,437 A 6/1997 Burkhardt et al.
5,643,847 A 7/1997 Walzer, Jr.
5,665,818 A 9/1997 Tilston et al.
5,668,228 A 9/1997 Chinh et al.
5,672,668 A 9/1997 Winter et al.
5,677,375 A 10/1997 Rifi et al.
5,705,568 A 1/1998 Gahleitner et al.
6,087,291 A 7/2000 Speca et al.
6,100,214 A 8/2000 Walzer, Jr. et al.
6,114,479 A 9/2000 Speca et al.
6,117,955 A 9/2000 Agapiou et al.
6,124,230 A 9/2000 Speca et al.
6,140,432 A 10/2000 Agapiou et al.
6,143,686 A 11/2000 Vizzini et al.
6,147,173 A 11/2000 Holtcamp
6,180,735 B1 1/2001 Wenzel
6,194,341 B1 2/2001 Canich et al.
6,207,606 B1 3/2001 Lue et al.
6,211,105 B1 4/2001 Holtcamp
6,218,558 B1 4/2001 Kato et al.
6,228,795 B1 5/2001 Vizzini
6,242,545 B1 6/2001 Jejelowo et al.
6,245,705 B1 6/2001 Kissin
6,245,706 B1 6/2001 Hlatky
6,245,868 B1 6/2001 Agapiou et al.
6,248,845 B1 6/2001 Loveday et al.
6,252,097 B1 6/2001 Sugano et al.
6,255,515 B1 7/2001 Kato et al.
6,271,323 B1 8/2001 Loveday et al.
6,274,684 B1 8/2001 Loveday et al.
6,300,436 B1 10/2001 Agapiou et al.
6,339,134 B1 1/2002 Crowther et al.
6,340,730 B1 1/2002 Murray et al.
6,346,586 B1 2/2002 Agapiou et al.
6,359,072 B1 3/2002 Whaley
6,372,324 B1 4/2002 Fujii et al.
6,376,407 B1 4/2002 Burkhardt et al.
6,376,408 B1 4/2002 Burkhardt et al.
6,376,409 B1 4/2002 Burkhardt et al.
6,376,410 B1 4/2002 Burkhardt et al.
6,376,411 B1 4/2002 Burkhardt et al.
6,376,412 B1 4/2002 Burkhardt et al.
6,376,413 B1 4/2002 Kuchta et al.
6,376,627 B1 4/2002 Burkhardt et al.
6,380,120 B1 4/2002 Burkhardt et al.
6,380,121 B1 4/2002 Kuchta et al.
6,380,122 B1 4/2002 Kuchta et al.
6,380,123 B1 4/2002 Kuchta et al.
6,380,124 B1 4/2002 Burkhardt et al.
6,380,328 B1 4/2002 McConville et al.
6,380,330 B1 4/2002 Burkhardt et al.
6,380,331 B1 4/2002 Kuchta et al.
6,380,334 B1 4/2002 Kuchta et al.
6,399,723 B1 6/2002 Burkhardt et al.
6,420,580 B1 7/2002 Holtcamp et al.
6,506,842 B1 1/2003 HEck et al.
6,548,600 B2 4/2003 Walton
6,653,254 B1 11/2003 Shamshoum et al.
6,914,113 B2 7/2005 McLeod et al.
7,056,991 B2 6/2006 Tharappel et al.
7,750,086 B2 7/2010 Scheie et al.
9,255,168 B2 2/2016 Tse
2006/0135698 A1 6/2006 Mier et al.
2008/0071029 A1 3/2008 Ono
2010/0201016 A1 8/2010 Kawamura
2017/0320975 A1 11/2017 Fiebig et al.

FOREIGN PATENT DOCUMENTS

EP 0495375 A2 7/1992
EP 0500944 A1 9/1992
EP 0520732 A1 12/1992
EP 0549900 A1 7/1993
EP 0561476 A1 9/1993
EP 0570982 A1 11/1993
EP 0573403 A2 12/1993
EP 0576970 A1 1/1994
EP 0594218 A1 4/1994
EP 0611773 A2 8/1994
EP 1223181 A1 7/2002
WO 9200333 A2 1/1992
WO 9407928 A1 4/1994
WO 9410180 A1 5/1994
WO 9732906 A1 9/1997
WO 9814585 A1 4/1998
WO 9822486 A1 5/1998
WO 0012565 A1 3/2000

OTHER PUBLICATIONS

International Search Report and Written Opinion issued in Application No. PCT/US2019/050788, dated Nov. 25, 2019, 16 pages.

POLYETHYLENE AND CONTROLLED RHEOLOGY POLYPROPYLENE POLYMER BLENDS AND METHODS OF USE

CROSS REFERENCE TO RELATED APPLICATIONS

This application is a continuation application of and claims priority to U.S. patent application Ser. No. 16/569,062 filed Sep. 12, 2019, which claims the benefit of U.S. Provisional Patent Application No. 62/731,198 filed Sep. 14, 2018. The contents of the referenced applications are incorporated into the present application by reference.

BACKGROUND OF THE INVENTION

A. Field of the Invention

The invention generally concerns polymer blends that include polyethylene (PE) and controlled rheology polypropylene (CRPP). The blend can have a PE to CRPP polymer (PE:CRPP) weight ratio of greater than 1:1.

B. Description of Related Art

Synthetic polymeric materials, particularly thermoplastic resins, are widely used in the manufacturing of a variety of end-use articles ranging from medical devices to food containers. Conventional polyolefins materials have long been used in processes requiring high melt strength like blown film, thermoforming, blow molding, extrusion coating, etc. The required melt strength for these processes is typically achieved by increasing molecular weight, broadening of molecular weight distribution and/or increasing long chain branching. However, polymers with very high molecular weight can be difficult to process due to very high viscosity. Molecular weight and molecular weight distribution can be modified in the polymerization process itself by choosing particular process conditions and catalysts. Additionally, various other approaches, including the use of additives during extrusion, have been developed. In any case, there is still a need for polymers having good melt strength, extensional properties and processability for film blowing, extrusion coating, foam extrusion, thermoforming and the like.

SUMMARY OF THE INVENTION

A discovery has been made that provides a solution to at least some of the problems associated with melt strength and extensional properties of polymers used in film blowing, molding, or forming applications. The discovery is premised on a polymer blend that includes a polyethylene (PE) polymer and a controlled rheology polypropylene (CRPP) polymer, where the blend has a PE:CRPP weight ratio of greater than 1:1. The polymer blend of the present invention can exhibit a higher melt strength than the melt strength of the PE absent the CRPP polymer. As exemplified in the Examples, it was surprisingly found that the addition of CRPP did not appear to have a significant effect on the melt flow rate of the PE, however, a significant beneficial effect in the rheological properties was observed. For example, a significant decrease in breadth parameter and increase in zero shear viscosity was observed for the blend when compared to unblended PE.

In one aspect of the present invention, polymer blends containing PE and controlled rheology polypropylene (CRPP) are described. A polymer blend can have a PE:CRPP weight ratio of greater than 1:1 and/or the CRPP polymer can include unreacted prodegradant (e.g., a peroxide compound) blended therewith. The PE can be a low density polyethylene (LDPE), linear low density polyethylene (LLDPE), medium density polyethylene (MDPE), high density polyethylene (HDPE), ethylene copolymers, or blends thereof. In some embodiments, the PE polymer can be produced with a metallocene catalyst. The blend can include from 0.1 wt. % to 40 wt. %, 0.5 wt. % to 30 wt. %, or 1 wt. % to 10 wt. % of the CRPP polymer and 60 to 99.9 wt. %, 99.5 wt. % to 70 wt. %, or 99 wt. % to 90 wt. % of the PE. The CRPP polymer can have a melt flow rate (MFR) of at least 100 g/10 min, alternatively 250 g/10 min, alternatively higher than 500 g/10 min, or alternatively higher than 1,000 g/10 min. In an embodiment, the CRPP may have an MFR of at least 1,300 g/10 min. The CRPP can include 0.001 wt. % to 5 wt. % of the unreacted prodegradant. The polymer blend can include one or more additives. Non-limiting examples of additives include an antiblocking agent, an antistatic agent, an antioxidant, a neutralizing agent, a blowing agent, a crystallization aid, a dye, a flame retardant, a filler, an impact modifier, a mold release agent, an oil, another polymer, a pigment, a processing agent, a reinforcing agent, a nucleating agent, a clarifying agent, a slip agent, a flow modifier, a stabilizer, an UV resistance agent, and combinations thereof. The melt strength of the polymer blend can be greater than the melt strength of the PE polymer absent the CRPP polymer. Higher melt strength can include an increased zero shear viscosity and/or a decreased breadth parameter as compared to the PE polymer absent the CRPP polymer.

Methods of producing the polymer blends of the present invention are also described. A method can include (a) obtaining a controlled-rheology polypropylene (CRPP) polymer comprising unreacted prodegradant and (b) combining the CRPP polymer with a polyethylene (PE) in a PE:CRPP weight ratio of greater than 1:1 to form a polymeric blend of the present invention. The polymeric blend can have a higher melt strength as compared to the melt strength of the step (b) PE polymer (i.e., PE without CRPP). Obtaining the CRPP polymer can include mixing the polypropylene polymer with a prodegradant compound to produce an unreacted prodegradant containing CRPP polymer. The CRPP polymer can have a melt flow rate of at least 100 g/10 min, alternatively 250 g/10 min, or alternatively 500 g/10 min. The method can include forming an article of manufacture from the polymer blend. Articles of manufacture can be formed by extruding the polymer blend, providing the polymeric blend to a mold as a molten material and cooling the polymeric blend in the mold, foaming the polymer blend, or thermo-foaming the polymeric blend.

In some embodiments articles of manufacture that include the polymer blend of the present invention are described. Non-limiting examples of articles of manufacture include a film, a molded part, a container, a lid, a sheet, a pipe, a pipe coupling, a bottle, a cup, a tray, a pallet, or a toy, or combinations thereof.

Also disclosed in the context of the present invention are aspects 1-20. Aspect 1 is a polymer blend comprising a polyethylene (PE) and a controlled-rheology polypropylene (CRPP) having a PE to CRPP (PE:CRPP) weight ratio of greater than 1:1. Aspect 2 is the polymer blend of aspect 1, wherein the CRPP comprises unreacted prodegradant blended therewith. Aspect 3 is the polymer blend of aspect 2, wherein the prodegradant is a peroxide compound. Aspect 4 is the polymer blend of any one of aspects 1 to 3, wherein the polymer blend has a higher melt strength than the melt strength of the PE absent the CRPP. Aspect 5 is the polymer blend of aspect 4, wherein the higher melt strength of the polymer blend comprises an increased zero shear viscosity and a decreased breadth parameter as compared to the PE absent the CRPP. Aspect 6 is the polymer blend of any one of aspects 1 to 5, wherein the PE is selected from the group consisting of a low density polyethylene (LDPE), a linear low density polyethylene (LLDPE), a medium density polyethylene (MDPE), a high density polyethylene (HDPE), an ethylene copolymer, or blends thereof. Aspect 7 is the polymer blend of aspect 6, wherein the PE is a metallocene catalyst based polymer. Aspect 8 is the polymer blend of any one of aspects 1 to 7, wherein the blend includes from 0.1 wt. % to 40 wt. %, 0.5 wt. % to 30 wt. %, or 1 wt. % to 10 wt. % of CRPP and 60 to 99.9 wt. %, 99.5 wt. % to 70 wt. %, or 99 wt. % to 90 wt. % of PE. Aspect 9 is the polymer blend of any one of aspects 1 to 8, wherein the CRPP has a melt flow rate (MRF) of at least 100 g/10 min, 250 g/10 min, 250 g/10 min, 500 g/10 min, or higher than 1,000 g/10 min. Aspect 10 is the polymer blend of aspect 9, wherein the CRPP comprises 0.001 wt. % to 5 wt. % of unreacted prodegradant. Aspect 11 is the polymer blend of any one of aspects 1 to 10, further comprising one or more additives. Aspect 12 is the polymer blend of aspect 11, wherein the additive comprises an antiblocking agent, an antistatic agent, an antioxidant, a neutralizing agent, a blowing agent, a crystallization aid, a dye, a flame retardant, a filler, an impact modifier, a mold release agent, an oil, another polymer, a pigment, a processing agent, a reinforcing agent, a nucleating agent, a clarifying agent, a slip agent, a flow modifier, a stabilizer, an UV resistance agent, and combinations thereof.

Aspect 13 is a method of producing the polymer blend of any one of aspects 1 to 12, the method comprising: (a) obtaining a controlled-rheology polypropylene (CRPP) comprising unreacted prodegradant; and (b) combining the CRPP with polyethylene (PE) in a PE:CRPP weight ratio of greater than 1:1 to form the polymer blend of any one of aspects 1 to 12. Aspect 14 is the method of aspect 13, wherein the polymer blend has a higher melt strength as compared to the melt strength of the step (b) PE absent the CRPP. Aspect 15 is the method of any one of aspects 13 to 14, wherein obtaining the CRPP comprises reacting a polypropylene polymer with the prodegradant to produce the CRPP polymer having a melt flow rate of at least 100 g/10 min, 250 g/10 min, or 500 g/10 min, and wherein the CRPP comprises unreacted prodegradant. Aspect 16 is the method of any one of aspects 13 to 15, further comprising extruding the polymer blend. Aspect 17 is the method of any one of aspects 13 to 16, further comprising providing the polymer blend to a mold as a molten material, and cooling the polymeric blend in the mold. Aspect 18 is the method of any one of aspects 13 to 17, further comprising foaming or thermo-foaming the polymer blend.

Aspect 19 is an article of manufacture comprising the polymeric blend of any one of aspects 1 to 12. Aspect 20 is the article of manufacture of aspect 19, wherein the article of manufacture is a film, a molded part, a container, a lid, a sheet, a pipe, a pipe coupling, a bottle, a cup, a tray, a pallet, or a toy, or combinations thereof.

The following includes definitions of various terms and phrases used throughout this specification.

The phrases "melt flow rate" or "melt index (MFR or MI2)" refer to the measurement of the ease of flow of the melt of a thermoplastic polymer or blend. Herein "melt flow rate" or MFR is used for polypropylene and "melt index" or "MI2" is used for polyethylene and polyethylene-rich blends. MFR values referred to herein are those determined according to ASTM D1238 at a temperature of 230° ° C. with a ram weight of 2.16 kg. MFR measurements reported herein were conducted using a Tinuius-Olsen (USA) MP1200 melt flow indexer. MI2 values referred to herein are those determined according to ASTM D1238 at a temperature of 190° C. with a ram weight of 2.16 kg. MI2 measurements reported herein were conducted using a Tinuius-Olsen MP993 melt flow indexer.

The phrase "melt strength" refers to the resistance of the polymer melt to stretching. The melt strength of the polymer blend composition can be related to the molecular chain entanglements of the polymer and its resistance to untangling under strain. The polymer properties affecting the resistance to untangling are molecular weight, molecular weight distribution (MWD), and molecular branchin). Melt strength can be related to the extensional viscosity of the polymer, which can be determined by convergent-flow rheometry. Melt strength can be indirectly assessed using rheology parameters such as zero-shear viscosity, breadth parameter and flow activation energy. A description on how these parameters are calculated can be found in patent U.S. Pat. No. 6,914,113 to McLeod et al.

The terms "about" or "approximately" are defined as being close to as understood by one of ordinary skill in the art. In one non-limiting embodiment, the terms are defined to be within 10%, within 5%, within 1%, and within 0.5%.

The terms "wt. %," "vol. %," or "mol. %" refers to a weight percentage of a component, a volume percentage of a component, or molar percentage of a component, respectively, based on the total weight, the total volume of material, or total moles, that includes the component. In a non-limiting example, 10 grams of component in 100 grams of the material is 10 wt. % of component.

The term "substantially" and its variations are defined to include ranges within 10%, within 5%, within 1%, or within 0.5%.

The terms "inhibiting" or "reducing" or "preventing" or "avoiding" or any variation of these terms, when used in the claims and/or the specification includes any measurable decrease or complete inhibition to achieve a desired result.

The term "effective," as that term is used in the specification and/or claims, means adequate to accomplish a desired, expected, or intended result.

The use of the words "a" or "an" when used in conjunction with any of the terms "comprising," "including," "containing," or "having" in the claims, or the specification, may mean "one," but it is also consistent with the meaning of "one or more," "at least one," and "one or more than one."

The words "comprising" (and any form of comprising, such as "comprise" and "comprises"), "having" (and any form of having, such as "have" and "has"), "including" (and any form of including, such as "includes" and "include") or "containing" (and any form of containing, such as "contains" and "contain") are inclusive or open-ended and do not exclude additional, unrecited elements or method steps.

The polymer blends of the present invention can "comprise," "consist essentially of," or "consist of" particular ingredients, components, compositions, etc. disclosed throughout the specification. With respect to the transitional phrase "consisting essentially of," in one non-limiting aspect, a basic and novel characteristic of the polymer blends of the present invention are (1) their abilities to be formed into articles of manufacture and/or (2) their increased melt strength when compared with the melt strength of unblended PE.

Other objects, features and advantages of the present invention will become apparent from the following figures, detailed description, and examples. It should be understood, however, that the figures, detailed description, and examples, while indicating specific embodiments of the invention, are given by way of illustration only and are not meant to be limiting. Additionally, it is contemplated that changes and modifications within the spirit and scope of the invention will become apparent to those skilled in the art from this detailed description. In further embodiments, features from specific embodiments may be combined with features from other embodiments. For example, features from one embodiment may be combined with features from any of the other embodiments. In further embodiments, additional features may be added to the specific embodiments described herein.

DETAILED DESCRIPTION OF THE INVENTION

A discovery has been made that provides a solution to at least some of the problems associated with processing polyethylene polymers and the articles of manufacture made from such polymer blends. The solution is premised on blending a controlled rheology polypropylene polymer with the polyethylene polymer in amounts such that the PE polymer is in excess (e.g., the PE:CRPP ratio is greater than 1:1). Such polymer blend can provide improved performance for molding, extruding, and blowing processes.

These and other non-limiting aspects of the present invention are discussed in further detail in the following sections.

A. Materials

1. Polymers

The polymers used in the polymer blend can include polyolefins. Polyolefins can be prepared by any of the polymerization processes, which are in commercial use (e.g., a "high pressure" process, a slurry process, a solution process and/or a gas phase process) and with the use of any of the known catalysts (e.g., Ziegler Natta catalysts, chromium or Phillips catalysts, single site catalysts, metallocene catalysts, and the like). Non-limiting examples of polyolefins include polypropylenes and polyethylenes. Polyethylenes can include homopolymers of ethylene or copolymers of ethylene with at least one alpha olefin (e.g., butene, hexene, octene and the like). Non-limiting examples of polyethylenes include low density polyethylene (LDPE), a linear low density polyethylene (LLDPE), a medium density polyethylene (MDPE), a high density polyethylene (HDPE), an ethylene copolymer, or blends thereof. Polypropylenes include homopolymers of propylene, copolymers of propylene and other olefins, and terpolymers of propylene, ethylene, and dienes. A controlled rheology grade polypropylene (CRPP) is one that has been further processed (e.g., through a degradation process) to produce a polypropylene polymer with a targeted high melt flow index (MFI), lower molecular weight, and/or a narrower molecular weight distribution than the starting polypropylene. The CRPP can have a melt flow rate of at least 100 g/10 min to 500 g/10 min, or at least, equal to, or between any two of 100 g/10 min, 150 g/10 min, 200 g/10 min, 250 g/10 min, 300 g/10 min, 350 g/10 min, 400 g/10 min, 450 g/10 min, and 500 g/10 min.

The polyolefin may also be prepared using any other method such as a combination of Ziegler-Natta and metallocene catalysts, for example as described in U.S. Pat. Nos. 7,056,991 and 6,653,254.

Ziegler-Natta Catalysts

Traditionally, catalyst systems used in bulk loop reactors for the commercial production (polymer production in the range of between 1 and up to 5 tons/hour and desirably between at least 1 ton to at least 50 tons/hour over a period of between at least about 5 days up to at least about 2 years) of polypropylene homopolymers and/or copolymers are commonly known as conventional Ziegler-Natta catalyst systems (hereafter may also be referred to as "Ziegler-Natta catalysts" or "Ziegler-Natta catalyst systems"). Non-limiting examples of conventional Ziegler-Natta catalysts are described in U.S. Pat. Nos. 4,701,432; 4,987,200; 3,687,920; 4,086,408; 4,376,191; 5,019,633; 4,482,687; 4,101,445; 4,560,671; 4,719,193; 4,755,495; and 5,070,055, each of which is incorporated by reference herein in its entirety. These Ziegler-Natta catalyst systems can include a Ziegler-Natta catalyst, a support, one or more internal donors, and one or more external donors.

Conventional Ziegler-Natta catalysts are stereospecific complexes formed from a transition metal halide and a metal alkyl or hydride and can produce isotactic polypropylenes. The Ziegler-Natta catalysts are derived from a halide of a transition metal, such as titanium, chromium or vanadium with a metal hydride and/or metal alkyl, typically an organoaluminum compound as a co-catalyst. The catalyst can include a titanium halide supported on a magnesium compound. Ziegler-Natta catalysts, such as titanium tetrachloride (TiCl4) supported on an active magnesium dihalide, such as magnesium dichloride or magnesium dibromide, as disclosed, for example, in U.S. Pat. Nos. 4,298,718 and 4,544,717, both to Mayr et al. are supported catalysts. Silica may also be used as a support. The supported catalyst may be employed in conjunction with a co-catalyst such as an alkylaluminum compound, for example, tricthylaluminum (TEAL), trimethyl aluminum (TMA) and triisobutyl aluminum (TIBAL).

Conventional Ziegler-Natta catalysts may be used in conjunction with one or more internal electron donors. These internal electron donors are added during the preparation of the catalysts and may be combined with the support or otherwise complexed with the transition metal halide. A suitable Ziegler-Natta catalyst containing a diether-based internal donor compound is that available as Mitsui RK-100 and Mitsui RH-220, both manufactured by Mitsui Chemicals, Inc., Japan. The RK-100 catalyst additionally includes an internal phthalate donor. The Ziegler-Natta catalyst can be a supported catalyst. Suitable support materials include magnesium compounds, such as magnesium halides, dialkoxymagnesiums, alkoxymagnesium halides, magnesium oxyhalides, dialkylmagnesiums, magnesium oxide, magnesium hydroxide, and carboxylates of magnesium. Typical magnesium levels are from about 12% to about 20% by weight of catalyst. The RK-100 catalyst contains approximately 2.3% by weight titanium, with approximately 17.3% by weight magnesium. The RH-220 catalyst contains approximately 3.4% by weight titanium, with approximately 14.5% by weight magnesium.

Conventional Ziegler-Natta catalysts can also be used in conjunction with one or more external donors. Generally such external donors act as stereoselective control agents to control the amount of atactic or non-stereoregular polymer produced during the reaction, thus reducing the amount of xylene solubles. Examples of external donors include the organosilicon compounds such as cyclohexylmethyl dimethoxysilane (CMDS), dicyclopentyl dimethoxysilane (CPDS) and diisopropyl dimethoxysilane (DIDS). External donors, however, may reduce catalyst activity and may tend to reduce the melt flow of the resulting polymer.

Metallocene Catalyst System

Other catalyst systems useful for polymerizing propylene are based upon metallocenes. Metallocenes can be characterized generally as coordination compounds incorporating one or more cyclopentadienyl (Cp) groups (which may be substituted or unsubstituted and may be the same or different) coordinated with a transition metal through n bonding. The Cp groups may also include substitution by linear, branched or cyclic hydrocarbyl radicals and desirably cyclic hydrocarbyl radicals so as to form other contiguous ring structures, including, for example indenyl, azulenyl and fluorenyl groups. These additional ring structures can also be substituted or unsubstituted by hydrocarbyl radicals and desirably C1 to C20 hydrocarbyl radicals. Metallocene compounds may be combined with an activator and/or cocatalyst (as described in greater detail below) or the reaction product of an activator and/or cocatalyst, such as for example methylaluminoxane (MAO) and optionally an alkylation/scavenging agent such as trialkylaluminum compound (TEAL, TMA and/or TIBAL). Various types of metallocenes are known in the art, which may be supported. Typical support may be any support such as talc, an inorganic oxide, clay, and clay minerals, ion-exchanged layered compounds, diatomaceous earth, silicates, zeolites or a resinous support material such as a polyolefin. Specific inorganic oxides include silica and alumina, used alone or in combination with other inorganic oxides such as magnesia, titania, zirconia and the like. Non-metallocene transition metal compounds, such as titanium tetrachloride, are also incorporated into the supported catalyst component. The inorganic oxides used as support are characterized as having an average particle size ranging from 30 600 microns, desirably from 30 100 microns, a surface area of 50 1,000 square meters per gram, desirably from 100 400 square meters per gram, a pore volume of 0.5 3.5 cc/g, desirably from about 0.5 2 cc/g.

Any metallocene may be used in the practice of the invention. As used herein unless otherwise indicated, "metallocene" includes a single metallocene composition or two or more metallocene compositions. Metallocenes are typically bulky ligand transition metal compounds generally represented by the formula: $[L]_mM[A]_n$ where L is a bulky ligand, A is a leaving group, M is a transition metal and m and n are such that the total ligand valency corresponds to the transition metal valency. The ligands L and A may be bridged to each other, and if two ligands L and/or A are present, they may be bridged. The metallocene compound may be full-sandwich compounds having two or more ligands L which may be cyclopentadienyl ligands or cyclopentadiene derived ligands or half-sandwich compounds having one ligand L, which is a cyclopentadienyl ligand or cyclopentadienyl derived ligand. The transition metal atom may be a Column 4, 5, or 6 transition metal and/or a metal from the lanthanide and actinide series of the Periodic Table. Non-limiting examples of metals include zirconium, titanium, and hafnium. Other ligands may be bonded to the transition metal, such as a leaving group. Non-limiting examples of ligands include hydrocarbyl, hydrogen or any other univalent anionic ligand. A bridged metallocene, for example, can be described by the general formula: RCpCp-'MeQx. Me denotes a transition metal element and Cp and Cp' each denote a cyclopentadienyl group, each being the same or different and which can be either substituted or unsubstituted, Q is an alkyl or other hydrocarbyl or a halogen group, x is a number and may be within the range of 1 to 3 and R is a structural bridge extending between the cyclopentadienyl rings. Metallocene catalysts and metallocene catalysts systems that produce isotactic polyolefins are disclosed in U.S. Pat. Nos. 4,794,096 and 4,975,403 which are incorporated by reference herein. These patents disclose chiral, stereorigid metallocene catalysts that polymerize olefins to form isotactic polymers and are especially useful in the polymerization of highly isotactic polypropylene.

Suitable metallocene catalysts are disclosed in, for example, U.S. Pat. Nos. 4,530,914; 4,542,199; 4,769,910; 4,808,561; 4,871,705; 4,933,403; 4,937,299; 5,017,714; 5,026,798; 5,057,475; 5,120,867; 5,132,381; 5,155,180; 5,198,401; 5,278,119; 5,304,614; 5,324,800; 5,350,723; 5,391,790; 5,436,305; 5,510,502; 5,145,819; 5,243,001; 5,239,022; 5,329,033; 5,296,434; 5,276,208; 5,672,668; 5,304,614, 5,374,752; 5,510,502; 4,931,417; 5,532,396; 5,543,373; 6,100,214; 6,228,795; 6,124,230; 6,114,479; 6,117,955; 6,087,291; 6,140,432; 6,245,706; 6,194,341, 6,399,723, 6,380,334, 6,380,331, 6,380,330, 6,380,124, 6,380,123, 6,380,122, 6,380,121, 6,380,120, 6,376,627, 6,376,413, 6,376,412, 6,376,411, 6,376,410, 6,376,409, 6,376,408, 6,376,407, 5,635,437, 5,554,704, 6,218,558, 6,252,097, 6,255,515 and EP Publication Nos. 549 900; 576 970; and 611 773; and WO 97/32906; 98/014585; 98/22486; and 00/12565.

Metallocenes may be used in combination with some form of activator in order to create an active catalyst system. The term "activator" is defined herein to be any compound or component, or combination of compounds or components, capable of enhancing the ability of one or more metallocenes to polymerize olefins to polyolefins. Alklyalumoxanes such as methylalumoxane (MAO) are commonly used as metallocene activators. Generally alkylalumoxanes contain about 5 to 40 of the repeating units. Alumoxane solutions, particularly methylalumoxane solutions, may be obtained from commercial vendors as solutions having various concentrations. There are a variety of methods for preparing alumoxane, non-limiting examples of which are described in U.S. Pat. Nos. 4,665,208, 4,952,540, 5,091,352, 5,206,199, 5,204,419, 4,874,734, 4,924,018, 4,908,463, 4,968,827, 5,308,815, 5,329,032, 5,248,801, 5,235,081, 5,103,031 and EP-A-0 561 476, EP 0 279 586, EP-A-0 594 218 and WO 94/10180, each fully incorporated herein by reference. (As used herein unless otherwise stated "solution" refers to any mixture including suspensions.)

Ionizing activators may also be used to activate metallocenes. These activators are neutral or ionic, or are compounds such as tri(n-butyl)ammonium tetrakis(pentaflurophenyl)borate, which ionize the neutral metallocene compound. Such ionizing compounds may contain an active proton, or some other cation associated with, but not coordinated or only loosely coordinated to, the remaining ion of the ionizing compound. Combinations of activators may also be used, for example, alumoxane and ionizing activators in combinations, see for example, WO 94/07928.

Descriptions of ionic catalysts for coordination polymerization comprised of metallocene cations activated by non-coordinating anions appear in the early work in EP-A-0 277 003, EP-A-0 277 004 and U.S. Pat. No. 5,198,401 and WO-A-92/00333 (incorporated herein by reference). These teach a desirable method of preparation wherein metallocenes (bisCp and monoCp) are protanated by an anion precursor such that an alkyl/hydride group is abstracted from a transition metal to make it both cationic and charge-balanced by the non-coordinating anion. Suitable ionic salts include tetrakis-substituted borate or aluminum salts having fluorided aryl-constituents such as phenyl, biphenyl and napthyl.

The term "noncoordinating anion" ("NCA") means an anion which either does not coordinate to said cation or which is only weakly coordinated to said cation thereby remaining sufficiently labile to be displaced by a neutral Lewis base. "Compatible" noncoordinating anions are those which are not degraded to neutrality when the initially formed complex decomposes. Further, the anion will not transfer an anionic substituent or fragment to the cation so as to cause it to form a neutral four coordinate metallocene compound and a neutral by-product from the anion.

The use of ionizing ionic compounds not containing an active proton but capable of producing both the active metallocene cation and a noncoordinating anion is also known. See, for example, EP-A-0 426 637 and EP-A-0 573 403 (incorporated herein by reference). An additional method of making the ionic catalysts uses ionizing anion precursors which are initially neutral Lewis acids but form the cation and anion upon ionizing reaction with the metallocene compounds, for example the use of tris(pentafluorophenyl) borane, see EP-A-0 520 732 (incorporated herein by reference). Ionic catalysts for addition polymerization can also be prepared by oxidation of the metal centers of transition metal compounds by anion precursors containing metallic oxidizing groups along with the anion groups, see EP-A-0 495 375 (incorporated herein by reference).

Where the metal ligands include halogen moieties (for example, bis-cyclopentadienyl zirconium dichloride) which are not capable of ionizing abstraction under standard conditions, they can be converted via known alkylation reactions with organometallic compounds such as lithium or aluminum hydrides or alkyls, alkylalumoxanes, Grignard reagents, etc. See EP-A-0 500 944 and EP-A1-0 570 982 for in situ processes describing the reaction of alkyl aluminum compounds with dihalo-substituted metallocene compounds prior to or with the addition of activating anionic compounds.

Desirable methods for supporting ionic catalysts comprising metallocene cations and NCA are described in U.S. Pat. Nos. 5,643,847; 6,228,795; and 6,143,686. When using the support composition, these NCA support methods can include using neutral anion precursors that are sufficiently strong Lewis acids to react with the hydroxyl reactive functionalities present on the silica surface such that the Lewis acid becomes covalently bound. Additionally, when the activator for the metallocene supported catalyst composition is a NCA, desirably the NCA is first added to the support composition followed by the addition of the metallocene catalyst. When the activator is MAO, desirably the MAO and metallocene catalyst are dissolved together in solution. The support is then contacted with the MAO/metallocene catalyst solution. Other methods and order of addition will be apparent to those skilled in the art.

The polyolefin may be formed by placing one or more olefin monomer (e.g., ethylene, propylene) alone or with other monomers in a suitable reaction vessel in the presence of a catalyst (e.g., Ziegler-Natta, metallocene, etc.) and under suitable reaction conditions for polymerization thereof. Any suitable equipment and processes for polymerizing the olefin into a polymer may be used. For example, such processes may include solution phase, gas phase, slurry phase, bulk phase, high pressure processes or combinations thereof. Such processes are described in detail in U.S. Pat. Nos. 5,525,678; 6,420,580; 6,380,328; 6,359,072; 6,346,586; 6,340,730; 6,339,134; 6,300,436; 6,274,684; 6,271,323; 6,248,845; 6,245,868; 6,245,705; 6,242,545; 6,211,105; 6,207,606; 6,180,735; and 6,147,173, which are incorporated herein by reference in their entirety.

Polyolefins can be formed by a gas phase polymerization process. One example of a gas phase polymerization process includes a continuous cycle system, wherein a cycling gas stream (otherwise known as a recycle stream or fluidizing medium) is heated in a reactor by heat of polymerization. The heat is removed from the cycling gas stream in another part of the cycle by a cooling system external to the reactor. The cycling gas stream containing one or more monomers may be continuously cycled through a fluidized bed in the presence of a catalyst under reactive conditions. The cycling gas stream is generally withdrawn from the fluidized bed and recycled back into the reactor. Simultaneously, polymer product may be withdrawn from the reactor and fresh monomer may be added to replace the polymerized monomer. The reactor pressure in a gas phase process may vary from 100 psig to 500 psig, or from 200 psig to 400 psig, or from 250 psig to 350 psig. The reactor temperature in a gas phase process can be from 30° C. to 120° C. or from 60° ° C. to 115° C. or from 70° C. to 110° C. or from 70° C. to 95° C. Non-limiting examples of polymer processes are described in U.S. Pat. Nos. 4,543,399; 4,588,790; 5,028,670; 5,317,036; 5,352,749; 5,405,922; 5,436,304; 5,456,471; 5,462,999; 5,616,661; 5,627,242; 5,665,818; 5,677,375; and 5,668,228, which are incorporated herein by reference in their entirety.

2. Prodegradants

The prodegradant can be the type that predictably and controllably affects the polymer's molecular properties without being significantly affected by minor fluctuations in the polymer's processing conditions. Prodegradants can include organic peroxides. Non-limiting examples of organic peroxides include 3,6,9-triethyl-3,6,9-trimethyl-1,4,7-triperoxonane, dicetyl peroxydicarbonate, 2,5-di(tert-butylperoxy)-2,5-dimethyl-3-hexane, 3,6,6,9,9-pentamethyl-3-(ethyl acetate)-1,2,4,5-textraoxy cyclononane; bis(tert-butylperoxydioxyisopropy)benzene, di-2-ethylhexylperoxydicarbonate, and ethyl 3,3-bis(2-mchtylbutan-2-ylperoxy)butanoate. The prodegradant can be added and processed in an amount and conditions that results in unreacted prodegradant being present in the CRPP. An example of a commercially available dialkyl peroxide that can be used as a prodegradant in the context of the present invention includes 2,5-dimethyl-2,5-di(tert-butylperoxy)hexane, available as Lupersol® 101, from Arkema, Inc (France). Commercially available peroxyketal peroxides include LupersoL® 233 and 533 (Arkema, Inc.) and Trigonox 301 (AkzoNobel), which are examples of t-butyl and t-amyl type peroxides, respectively. The choice of organic peroxide can vary depending upon the particular application and extruder temperatures. In some embodiments, about 0.01 to 10.0 wt. %, or at least, equal to, or between any two of 0.001, 0.01, 0.05, 0.1, 0.5, 1, and 5 wt. % based on the weight of prodegradant is in the CRPP polymer used in the blends of the present invention.

3. Additives

The polymer compositions of the present invention can further include at least one additive. Non-limiting examples of additives include an antiblocking agent, an antistatic agent, an antioxidant, a neutralizing agent, a blowing agent, a crystallization aid, a dye, a flame retardant, a filler, an impact modifier, a mold release agent, an oil, another polymer, a pigment, a processing agent, a reinforcing agent, a nucleating agent, a clarifying agent, a slip agent, a flow modifier, a stabilizer, an UV resistance agent, and combinations thereof. Additives are available from various commercial suppliers. Non-limiting examples of commercial additive suppliers include BASF (Germany), Dover Chemical Corporation (U.S.A.), AkzoNobel (The Netherlands), Sigma-Aldrich® (U.S.A.), Atofina Chemicals, Inc., and the like.

B. Preparation of Polymer Blends

The preparation of the PE:CRPP blends can be carried out in a customary mixing machine, in which the PE and CRPP can be melted and mixed with the optional additives. Suitable machines are known to those skilled in the art. Non-limiting examples include mixers, kneaders and extruders. In certain aspects, the process can be carried out in an extruder by introducing the additives during processing. Non-limiting examples of extruder can include single-screw extruders, contrarotating and co-rotating twin-screw extruders, planetary-gear extruders, ring extruders, or co-kneaders. Additionally, the PE and CRPP can also be dry-blended and the resulting polymer blend used in typical polymer processes (e.g., blown film extrusion, foam extrusion, sheet extrusion-thermoforming, etc.) In some embodiments, the CRPP that includes the unreacted prodegradant can be obtained and mixed with the polyethylene and or one or more optional additives to produce the polymer blend of the present invention. The PE, CRPP, or blend thereof can be subjected to an elevated temperature for a sufficient period of time during blending. The blending temperature can be above the softening point of the polymers The amounts of PE to CRPP can be adjusted as long as the weight ratio of PE:CRPP is greater than 1:1 up to 999:1. The PE:CRPP can be at least, equal to, or between any two of 1.1:1, 1.5:1, 10:1, 15:1, 20:1, 30:1, 40:1, 50:1, 60:1, 70:1, 80:1, 90:1, 100:1, 150:1, 200:1, 250:1, 300:1, 350:1, 450:1, 500:1, 600:1, 700:1, 800:1, 900:1, 950:1, and 999:1.

The unreacted prodegradant-containing CRPP can be obtained by adding to a polypropylene polymer an effective amount of prodegradant to produce the unreacted prodegradant containing CRPP having the desired melt flow rate. In an embodiment, the CRPP may have an MFR of at least 500 g/10 min, alternatively at least 1,000 g/10 min, alternatively at least 1,300 g/10 min. The prodegradant can be added and processed in an amount and conditions that results in unreacted prodegradant being present in the CRPP. An amount of prodegradant can range from 0.001 to 5 wt. %. In some embodiments, CRPP is obtained from a commercial source, for example Polypropylene 3962 from TOTAL Petrochemical & Refining USA, INC. (USA).

Additives can be premixed or added individually to the polymer blend or the CRPP/unreacted prodegradant blend. By way of example, the additives of the present invention can be premixed such that the blend is formed prior to adding it to the PE, the CRPP, or the unreacted prodegradant containing CRPP. The additive containing blend thereof can be subjected to an elevated temperature for a sufficient period of time during blending and/or incorporation of additives. Incorporation of additives into the polyolefin resin can be carried out, for example, by mixing the above-described components using methods customary in process technology. The blending temperature can be above the softening point of the polymers. In certain aspects, a process can be performed at a temperature from about 160° C. to 280° C. Such “melt mixing” or “melt compounding” results in uniform dispersion of the present additives and/or CRPP in the PE.

C. Polymer Blend

The polymer blends can include PE and CRPP in the ratios described above. In some embodiments, the polymer blend can include at least, equal to, or between any two of 0.1 wt. %, 1 wt. %, 5 wt. %, 10 wt. %, 15 wt. %, 20 wt. %, 25 wt. %, 30 wt. %, 35 wt. %, and 40 wt. % of the CRPP. An amount of PE can be at least, equal to, or between any two of 60 wt. %, 65 wt. %, 70 wt. %, 75 wt. %, 80 wt. %, 85 wt. %, 90 wt. %, 95 wt. %, and 99.9 wt. %. In some embodiments, the blend can include 0.1 wt. % to 40 wt. % CRPP and 60 wt. % to 99.9 wt. % PE. In another embodiment, the blend can include 0.5 wt. % to 30 wt. % CRPP and 99.5 wt. % to 70 wt. % PE. In yet another embodiment, the blend can include 1 wt. % to 20 wt. % CRPP and 99 wt. % to 80 wt. % of PE. The CRPP can be any of the CRPP described herein and have a melt flow rate of at least 100 g/10 min.

The polymer blend can have a higher melt strength than the PE absent the CRPP (e.g., the PE used to prepare the blend). Melt strength can be attributed to long chain braches, which introduce strain hardening. Melt strength can be evaluated by comparing zero shear viscosity and/or breadth parameter of the PE with and without the CRPP at the same temperature. By way of example, the zero shear viscosity can be increased by a factor of 1.1 to 10, or at least, equal to, or between any two of 1.1, 1.2, 1.3, 1.5, 2.0, 2.5, 3, 3.5, 4, 4.5, 5, 5.5, 6, 6.5, 7, 7.5, 8, 8.5, 9, 9.5 and 10. The breadth parameter can be reduced by at least, equal to, or between any two of 1% 15%, 20%, 25%, 30%, and 40%. In one embodiment, the PE prior to blending can have a zero shear viscosity of $2.3\times10^3$ Pa·s and a breadth parameter of 0.35 while the CRPP containing PE blend can have a zero shear viscosity of at least $3\times10^3$ Pa·s and/or a breadth parameter of less than 0.3, or $3\times10^3$ to $6\times10^{-3}$ Pa·s and/or a breadth parameter of 0.20 to 0.29 at the same temperature (e.g., 190° C.). In another embodiment, the PE prior to blending can have a zero shear viscosity of $3.1\times10^3$ Pa·s and a breadth parameter of 0.30 while the CRPP containing PE blend can have a zero shear viscosity of at least $6\times10^3$ Pa·s and/or a breadth parameter of less than 0.3, or 6.1 to 6.5 $10^{-3}$ Pa·s and/or a breadth parameter of 0.21 to 0.25 at the same temperature (e.g., 190° C.). In one embodiment, the PE prior to blending can have a zero shear viscosity of $4.1\times10^4$ Pa·s and a breadth parameter of 0.17 while the CRPP containing PE blend can have a zero shear viscosity of at least $4.2\times10^4$ Pa·s and/or a breadth parameter of less than 0.17, or 4.1 to 5.5 $10^3$ Pa·s and/or a breadth parameter of 0.169 to 0.155 at the same temperature (e.g., 190° C.).

D. Articles of Manufacture

The polymer blend compositions are normally collected as pellets, which can be stored for a time or employed immediately in a forming process. The forming processes can include injection molding, blown film, extrusion coating, extrusion blow molding, injection stretch blow molding, thermoforming, profile extrusion, compression molding or sheet extrusion. The final formed articles are for instance molded parts, sheets, films or fibers. Examples of molded parts include a container, a lid, a sheet, a pipe, a pipe coupling, a bottle, a cup, a tray, a pallet, or a toy, or combinations thereof.

EXAMPLES

The present invention will be described in greater detail by way of specific examples. The following examples are offered for illustrative purposes only, and are not intended to limit the invention in any manner. Those of skill in the art will readily recognize a variety of noncritical parameters which can be changed or modified to yield essentially the same results.

Testing Methods

The testing methods are described in U.S. Pat. No. 6,914,113 to McLeod et al., which is incorporated herein in its entirety.

Example 1

CRPP-Containing Metallocene Based Polyethylene Blends

Blends were prepared by extruding 1 and 3% PP 3962 (TOTAL Petrochemicals & Refining USA, Inc.) with a metallocene based polyethylene with hexene as comonomer (mPE Lumicene® M2710EP (TOTAL Petrochemicals & Refining USA, Inc.). The PP 3962 is a CRPP that included unreacted prodegradant. Table 1 lists amounts and rheological properties of the PE with and without the PP3962. As determined from the data, the addition of PP 3962 increased the zero shear viscosity and decreased the breadth parameter suggesting higher melt strength in spite of the very high melt flow rate of the PP 3962.

TABLE 1

| | mPE M2710EP | mPE M2710EP + 1% PP 3962 | mPE M2710EP + 3% PP 3962 |
|---|---|---|---|
| Flow Activation Energy [J/g] | 31.5 | 31.9 | 32.1 |
| Zero Shear Viscosity [Pa · s] | 4.0E+04 | 4.1E+04 | 5.3E+04 |
| Relaxation Time [s] | 1.5E−03 | 1.5E−03 | 1.4E−03 |
| Breadth Parameter [ ] | 0.170 | 0.169 | 0.156 |
| Temperature [° C.] | 190 | 190 | 190 |
| n parameter [ ] | 0 | 0 | 0 |

Example 2

CRPP-Containing Metallocene Based Medium Density Polyethylene Blends

Blends were prepared by extruding 5 and 10% PP 3962 (TOTAL Petrochemicals & Refining USA, Inc.) of Example 1 with a metallocene based medium density polyethylene with hexene as comonomer (mPE EC045D (TOTAL Petrochemicals & Refining USA, Inc.). Table 2 lists amounts and rheological properties of the PE with and without the PP 3962. As determined from the data, the addition of PP 3962 increased the zero shear viscosity and decreased the breadth parameter. Interestingly, in spite of its very high melt flow rate, the addition of PP 3962 did not have a significant effect on the melt index of the blends.

TABLE 2

| | mPE EC045D | mPE EC045D + 5% PP 3962 | mPE EC045D + 10% PP 3962 |
|---|---|---|---|
| MI2 [g/10 min] | 4.6 | 4.5 | 4.4 |
| Flow Activation Energy [J/g] | 32.0 | 33.0 | 34.3 |
| Zero Shear Viscosity [Pa · s] | 2.3E+03 | 3.1E+03 | 5.6E+03 |
| Relaxation Time [s] | 1.0E−03 | 9.6E−04 | 5.2E−04 |
| Breadth Parameter [ ] | 0.35 | 0.29 | 0.21 |
| Temperature [° C.] | 190 | 190 | 190 |
| n parameter [ ] | 0 | 0 | 0 |
| Mn | 22130 | 22252 | 21300 |
| Mw | 60577 | 62497 | 61274 |
| Mz | 122488 | 129006 | 129371 |
| Polydispersity | 2.7 | 2.8 | 2.9 |
| Peak MW | 48838 | 50814 | 48838 |

Example 3

CRPP-Containing Metallocene Based Medium Density Polyethylene Blends

A blend was prepared by extruding 10% PP 3962 (TOTAL Petrochemicals & Refining USA, Inc.) of Example 1 with a metallocene based medium density polyethylene with hexene as comonomer containing a UV additive (mPE M4041UV (TOTAL Petrochemicals & Refining USA, Inc.). Table 3 lists amounts and rheological properties of the PE with and without the PP3962. As determined from the data, the addition of PP 3962 increased the zero shear viscosity and decreased the breadth parameter suggesting higher melt strength in spite of the very high melt flow rate of the PP 3962.

TABLE 3

| | mPE M4041UV | mPE M4041UV + 10% PP 3962 |
|---|---|---|
| MI2 [g/10 min] | 3.9 | 4.2 |
| Flow Activation Energy [J/g] | 31.3 | 33.5 |
| Zero Shear Viscosity [Pa · s] | 3.1E+03 | 6.1E+03 |
| Relaxation Time [s] | 9.9E−04 | 7.5E−04 |
| Breadth Parameter [ ] | 0.30 | 0.21 |
| Temperature [° C.] | 190 | 190 |
| n parameter [ ] | 0 | 0 |
| Mn | 21620 | 20758 |
| Mw | 61856 | 62495 |
| Mz | 124702 | 132328 |
| Polydispersity | 2.9 | 3 |
| Peak MW | 52870 | 52870 |

Although embodiments of the present application and their advantages have been described in detail, it should be understood that various changes, substitutions and alterations can be made herein without departing from the spirit and scope of the embodiments as defined by the appended claims. Moreover, the scope of the present application is not intended to be limited to the particular embodiments of the process, machine, manufacture, composition of matter, means, methods and steps described in the specification. As one of ordinary skill in the art will readily appreciate from the above disclosure, processes, machines, manufacture, compositions of matter, means, methods, or steps, presently existing or later to be developed that perform substantially the same function or achieve substantially the same result as the corresponding embodiments described herein can be utilized. Accordingly, the appended claims are intended to include within their scope such processes, machines, manufacture, compositions of matter, means, methods, or steps.

The invention claimed is:

1. A polymer blend comprising 85-99.9 wt % of a polyethylene (PE) and 0.1-15 wt % of a controlled-rheology polypropylene (CRPP), wherein the CRPP comprises 0.001-5 wt % of unreacted prodegradant blended therewith and the prodegradant consists essentially of a peroxide compound, wherein the polymer blend has a higher melt strength than the melt strength of the PE absent the CRPP;

wherein:

a melt flow rate of the CRPP is from 500 g/10 minutes to 1,300 g/10 minutes as measured according to ASTM D1238 at a temperature of 230° C. with a ram weight of 2.16 kg;

a melt flow rate of the PE is from 3.9 g/10 minutes to 4.6 g/10 minutes as measured according to ASTM D1238 at a temperature of 230° C. with a ram weight of 2.16 kg; and wherein a melt flow rate of the polymer blend is the same as or less than the melt flow rate of the PE as measured according to ASTM D1238 at a temperature of 230° C. with a ram weight of 2.16 kg;

a zero shear viscosity of the polymer blend is increased by a factor of 1.3 to 10 compared to a zero shear viscosity of the PE absent the CRPP; and a breadth parameter of the polymer blend is reduced by 15% to 40% compared to the PE without the CRPP.

2. The polymer blend of claim 1, wherein the PE is selected from the group consisting of a low density polyethylene, a linear low density polyethylene, a high density polyethylene, an ethylene copolymer, and blends thereof.

3. The polymer blend of claim 1, wherein the PE is a low density polyethylene.

4. The polymer blend of claim 1, wherein the PE is a linear low density polyethylene.

5. The polymer blend of claim 1, wherein the PE is a high density polyethylene.

6. The polymer blend of claim 1, wherein the PE is an ethylene copolymer.

7. The polymer blend of claim 1, wherein the melt flow rate of the polymer blend is about same as the melt flow rate of the PE.

8. The polymer blend of claim 1, wherein the blend includes 1 wt. % to 10 wt. % of the CRPP and 99 wt. % to 90 wt. % of the PE.

9. The polymer blend of claim 1, further comprising one or more additives.

10. The polymer blend of claim 9, wherein the additive comprises an antiblocking agent, an antistatic agent, an antioxidant, a neutralizing agent, a blowing agent, a crystallization aid, a dye, a flame retardant, a filler, an impact modifier, a mold release agent, an oil, another polymer, a pigment, a processing agent, a reinforcing agent, a nucleating agent, a clarifying agent, a slip agent, a flow modifier, a stabilizer, an UV resistance agent, or combinations thereof.

11. A method of producing the polymer blend of claim 1, the method comprising:

(a) obtaining the controlled-rheology polypropylene (CRPP) comprising 0.001 wt. % to 5 wt. % of the unreacted prodegradant consisting essentially of the peroxide; and (b) combining 0.1-15 wt % of the CRPP obtained in the step (a) with 85-99.9 wt % of the polyethylene (PE) to form the polymer blend of claim 1, wherein the polymer blend has a higher melt strength as compared to the melt strength of the step (b) PE absent the CRPP;

wherein:

the melt flow rate of the CRPP is from 500 g/10 minutes to 1,300 g/10 minutes as measured according to ASTM D1238 at a temperature of 230° C. with a ram weight of 2.16 kg;

the melt flow rate of the PE is from 3.9 g/10 minutes to 4.6 g/10 minutes as measured according to ASTM D1238 at a temperature of 230° C. with a ram weight of 2.16 kg; and wherein a melt flow rate of the polymer blend is the same as or less than the melt flow rate of the PE as measured according to ASTM D1238 at a temperature of 230° C. with a ram weight of 2.16 kg;

a zero shear viscosity of the polymer blend is increased by a factor of 1.3 to 10 compared to a zero shear viscosity of the PE absent the CRPP; and a breadth parameter of the polymer blend is reduced by 15% to 40% compared to the PE without the CRPP.

12. The method of claim 11, wherein obtaining the CRPP comprises reacting a polypropylene polymer with the prodegradant to produce the CRPP polymer having a melt flow rate of from 500 g/10 min to 1,300 g/10 min, and wherein the CRPP comprises the unreacted prodegradant.

13. The method of claim 11, further comprising extruding the polymer blend.

14. The method of claim 11, further comprising providing the polymer blend to a mold as a molten material, and cooling the polymeric blend in the mold.

15. The method of claim 11, further comprising foaming or thermo-foaming the polymer blend.

16. An article of manufacture comprising the polymeric blend of claim 1.

17. The article of manufacture of claim 16, wherein the article of manufacture is a film, a molded part, a container, a lid, a sheet, a pipe, a pipe coupling, a bottle, a cup, a tray, a pallet, or a toy, or combinations thereof.

18. A method of producing a polymer blend, the method comprising:

(a) obtaining a controlled-rheology polypropylene (CRPP) comprising 0.001 wt. % to 5 wt. % of an unreacted prodegradant consisting essentially of a peroxide compound; and (b) combining 0.1-15 wt % of the CRPP obtained in the step (a) with 85-99.9 wt % of a polyethylene (PE) to form the polymer blend, wherein the polymer blend has a higher melt strength as compared to a melt strength of the step (b) PE absent the CRPP;

wherein:

a melt flow rate of the CRPP is from 500 g/10 minutes to 1,300 g/10 minutes as measured according to ASTM D1238 at a temperature of 230° C. with a ram weight of 2.16 kg;

a melt flow rate of the PE is from 3.9 g/10 minutes to 4.6 g/10 minutes as measured according to ASTM D1238 at a temperature of 230° C. with a ram weight of 2.16 kg; and wherein a melt flow rate of the polymer blend is the same as or less than the melt flow rate of the PE as measured according to ASTM D1238 at a temperature of 230° C. with a ram weight of 2.16 kg;

a zero shear viscosity of the polymer blend is increased by a factor of 1.3 to 10 compared to the zero shear viscosity of the PE absent the CRPP; and a breadth parameter of the polymer blend is reduced by 15% to 40% compared to the PE without the CRPP.

* * * * *